(No Model.)

W. L. WALKER & W. A. NELSON.
HOSE COUPLING.

No. 533,761. Patented Feb. 5, 1895.

WITNESSES:
F. M. Ardle
C. Sedgwick

INVENTORS:
W. L. Walker
BY W. A. Nelson
Munn & Co.
ATTORNEYS.

UNITED STATES PATENT OFFICE.

WILLIAM LEVI WALKER AND WILLIAM APPLETON NELSON, OF FITCHBURG, MASSACHUSETTS.

HOSE-COUPLING.

SPECIFICATION forming part of Letters Patent No. 533,761, dated February 5, 1895.

Application filed October 23, 1893. Serial No. 488,931. (No model.)

*To all whom it may concern:*

Be it known that we, WILLIAM LEVI WALKER and WILLIAM APPLETON NELSON, of Fitchburg, in the county of Worcester and State of Massachusetts, have invented a new and Improved Hose-Coupling, of which the following is a full, clear, and exact description.

Our invention relates to an improvement in hose couplings, and it has for its object to provide a coupler which will be exceedingly strong, simple and durable, and which will not leak.

A further object of the invention is to provide a hose coupler, or hose connection, capable of application to hydrants or to hose wherever they may be used, or with whatever object they may be connected.

A further object of the invention is to provide a hose coupler capable of being expeditiously and conveniently coupled.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
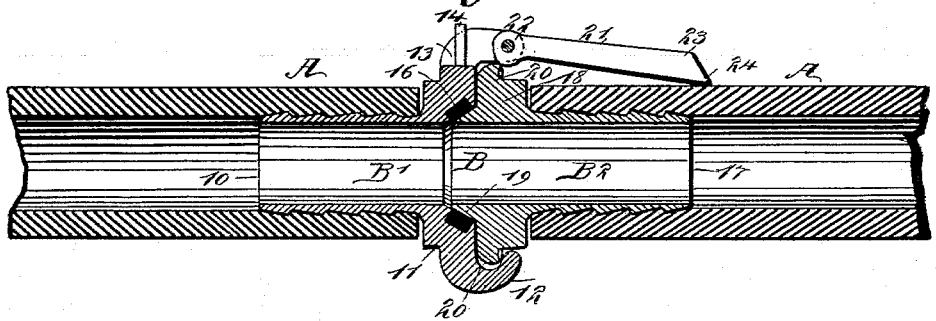
Figure 2:
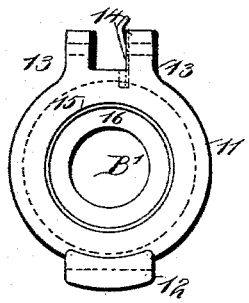
Figure 3:
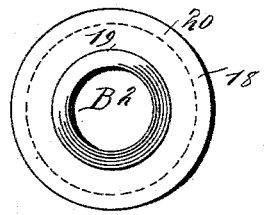

Figure 1 is a longitudinal vertical section through sections of a hose and its couplings, the couplings being shown in coupled position. Fig. 2 is a front elevation of one member of the coupling, and Fig. 3 is a similar view of the opposing member.

In carrying out the invention the hose A is secured to the coupling B in the usual or in any approved manner.

The coupling B, is made in two sections B' and B², the section B' being the female section and the section B² the male section. The female section of the coupling, in addition to its shank 10, which is inserted in the hose, comprises a head 11. The head is preferably made circular, or substantially so in general contour, and at a predetermined point in its circumference is provided with a forwardly-extending hook flange 12, and diametrically opposite the hook flange two parallel ears 13, are formed upon the head, which ears are spaced a predetermined distance apart and extend over and beyond the head at a right angle thereto, or substantially so. A spring latch 14, is located between the ears, being preferably adjacent to one of them, as shown in Fig. 2, the latch being either secured to the rear portion of the ear near which it is located, or it is attached to the head proper.

The head 11 of the female section B', is provided with a conical or beveled opening 15, and in the wall of this opening an annular recess is made, in which recess a gasket 16, is introduced and secured in any desired manner. The male section B² of the hose coupling comprises in addition to its shank 17 a head 18. The head is likewise made circular, and is provided with an opening registering with the bore of the shank.

Around the opening in the head a beveled outwardly projecting flange 19, is formed, said flange being adapted to enter the opening in the head of the female section, and the beveled surface of the flange is intended to engage with the outer surface of the gasket 16. The head of the male section of the coupler is also provided with a peripheral flange 20, and the said flange is cylindrical upon its outer surface, and is preferably more or less concaved upon its rear or inner surface.

The female section of the coupler carries a cam lever 21, said lever consisting of a cam head 22, which is pivoted between the ears 13 of the female section of the coupler, and a handle 23, preferably made integral with the head, which handle at its free end is ordinarily provided with a beveled surface 24.

In operation, the peripheral flange of the male section is introduced into the hook flange 12 of the female section. The two sections of the coupling are then brought together until they touch the forward flange of the male section, entering the opening in the female section and engaging with the gasket 16 thereof. The lever 21, is then pushed downward, whereupon its cam head will catch under the peripheral flange of the male section, and in so doing will draw the two sections of the coupler into such close connection that by no possibility can there be any leak; and when the lever is pushed downward until its handle strikes the hose, it will remain in that position, locking the sections together. Any inequalities in the engaging surfaces of the coupler sections will be overcome by the gasket 16. The gasket stands out far enough from the section with which it is connected to render the action of the lever necessary to bring the two sections together and effect a water-tight joint.

A coupler of the character described is superior to a threader coupler, as the threads will jam, and it often takes considerable time to correct a lead of the screw and make a proper connection. The action of the lever itself renders the connection tight and holds the sections securely in water-tight engagement. The contacting surfaces of the couplers being beveled, fitting one into the other, precludes all lateral motion. The rubber gasket being tapered renders the action of the lever 21 easy, the resistance of the rubber increasing only as the power of the cam increases until the highest point of the cam is passed, which then holds itself. This insures a positive, easy and sure connection, and also a tight joint.

The end of the lever being beveled will cause any object striking it to glance off, thereby precluding the possibility of the lever being thrown back by chance. A moderate pull laterally and legitimately applied on the lever will suffice to disengage the sections. The catch 14 between the ears to which the lever is attached acts as a keeper, and will hold the lever back upon the female section of the coupling when it is out of engagement with the male section. The slot in which the rubber gasket is placed is more or less tapered, thereby rendering the replacement of a gasket, when it is worn out, exceedingly convenient.

Having thus described our invention, we claim as new and desire to secure by Letters Patent—

1. In a hose or similar coupling, two sections adapted to engage with each other, one of said sections being provided with parallel ears projecting forward beyond the head of the section, a cam lever consisting of a cam head pivoted between the said ears and adapted to lock with the opposing section when moved in one direction, and a handle connected with the said head for operating the same, the said handle being adapted to be received between the said ears when the cam is turned to the unlocked position and means for holding the handle between the said ears, substantially as shown and described.

2. In a hose or similar coupling, two sections, a clasp formed on one of said sections and adapted to engage with the opposing section, parallel ears formed on one of said sections and extending beyond the head of the section, a cam lever pivoted between the ears at the ends thereof, and adapted for locking engagement with the opposing sections, and a spring latch located between the said ears, as and for the purpose set forth.

3. In a hose or like coupling, the combination with a section, the head of which is provided with a conical or beveled opening and a gasket in the wall of the same, the said section being also provided with a hook shaped clasp and with parallel ears formed diametrically opposite said clasp, a spring latch being located between the said ears, and a cam lever pivoted between the ears at the ends thereof and provided with a beveled outer end, of a second section the head of which is provided with an annular flange to be engaged by the cam lever and to be received by the hooked clasp, the said second section being further provided with a beveled flange extending from its forward face and adapted to enter the forward opening in the opposing section and engage with the gasket, substantially as specified.

WILLIAM LEVI WALKER.
WILLIAM APPLETON NELSON.

Witnesses:
HARRY M. PUTNAM,
RALPH A. FERSON.